Oct. 8, 1946.   J. M. MacLEAN   2,409,052
WHEEL
Filed July 20, 1944   2 Sheets-Sheet 1

INVENTOR
J. M. MacLEAN

Oct. 8, 1946.  J. M. MacLEAN  2,409,052
WHEEL
Filed July 20, 1944   2 Sheets-Sheet 2

INVENTOR
J. M. MacLEAN
ATTYS.

Patented Oct. 8, 1946

2,409,052

UNITED STATES PATENT OFFICE 2,409,052

WHEEL

James Matthew MacLean, Detroit, Mich.

Application July 20, 1944, Serial No. 545,811

6 Claims. (Cl. 295—11)

This invention relates to heavy duty flexible vehicle wheels.

In vehicle wheels such as street car wheels it has been proposed up to the present time to form the wheels from a combination of metal and rubber employing for instance a wheel frame dished in from each side, the dished portions being filled with rubber and capped by disc plates on the outside drawn together to exert the necessary pressure. Such wheels have constituted a marked improvement over the ordinary metal wheel that has been employed for a number of years. However, while such a wheel is advantageous in street car use where the load is comparatively light, on the other hand, when a wheel of this construction is proposed in connection with heavy loads it is entirely impractical.

The present invention deals with a vehicle wheel which primarily is designed for heavy duty but which may advantageously be used as a light duty wheel as well.

It is therefore an object of the present invention to provide a flexible vehicle wheel which is primarily designed for heavy duty and which will take heavy loads but which at the same time may be used with advantage in lighter duty.

A further object of the invention is to provide a wheel of this kind which will constitute a vibration dampening unit.

A further object of the invention is to provide a wheel of this kind which will provide for maximum load distribution in a uniform manner throughout the filling body of rubber or other shock absorbing filling material employed.

A still further object of the invention is to provide a wheel construction of this kind which will lend itself to practical production line manufacture.

A still further object of the invention is to provide a simplified method of wheel construction.

Referring to the drawings:

Fig. 6 is a fragmentary detail plan of an alternative form of wheel assembly.

Figure 4:
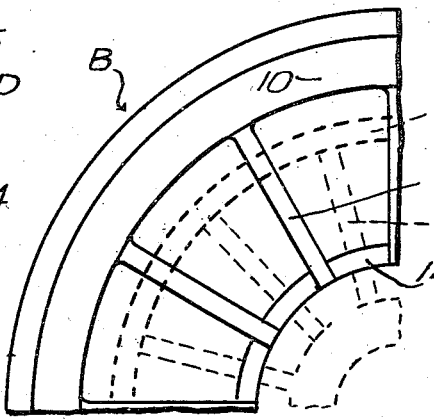
Fig. 4 is a fragmentary detailed view of one main element of the wheel construction.
Figure 5:
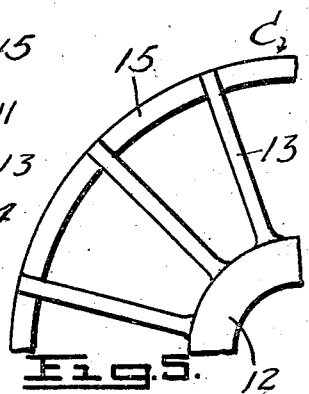
Fig. 5 is a fragmentary detail view of the complementary main element of the wheel construction to that shown in Fig. 4.

Referring to the drawings, A indicates a wheel according to the present invention which in the preferred form of construction is produced from two main complementary elements B and C, the former including the rim 10 having a plurality of radially inwardly projecting blades or the like 11 and the latter incorporating the hub 12 and having a plurality of radially outwardly extending blades or the like 13. These complementary main elements of the construction B and C are designed to be positioned in complementary relation to each other so as to dispose the blades of each element spaced an equi-distance between the blades of the other element. This arrangement is clearly shown in Fig. 1 and from which it will be noted that the length of the blades of each element B and C is less than the radial distance between the outer surface of the hub and the inner surface of the rim. These blade-like elements 11 and 13 respectively are designed to be reinforced or braced in the assembly structure by the tie or bracing rings 14 and 15 respectively, it being preferred that one of the rings 14 in the case of element B and opposed ring 14 in the case of element C should be cast integrally with the blades to which they apply, viz., 11 and 13 respectively. Thus, it is possible to assemble the two main elements in complementary relation as can clearly be visualized upon considering Figs. 4 and 5. In this instance it will be noted that the tie ring 14 and the tie ring 15 cast integrally with the blades to which they apply are disposed on the opposite edges of these blades. Therefore, if element C is taken and turned over the blades 13 may readily be disposed between the blades 11 of element B in which case ring 14 will be disposed on one side of the blades 11, indicated in dotted lines Fig. 4, while the ring 15 will be disposed on the opposite side of the blades 13. It is then only necessary to apply to opposite sides of the assembled structure the second bracing ring 14 or 15 which the case may be which is done in the preferred embodiment of my invention by spot or electric welding.

When the wheel structure has been so assembled it is then completed by embedding the blade-like elements in a filler D having yieldable characteristics and preferably rubber or a composition including rubber. In this instance, the dough-like filler is pressed into place under pressure so that the spaces between the blades and in fact all space between the hub and the rim is completely filled with the yieldable filler mass. The wheel is then subjected to a heat treatment to set the filler such as a vulcanizing operation in the case of rubber which then results in a complete wheel unit having vibration dampening characteristics which will be dealt with hereinafter.

Figures 1, 2:
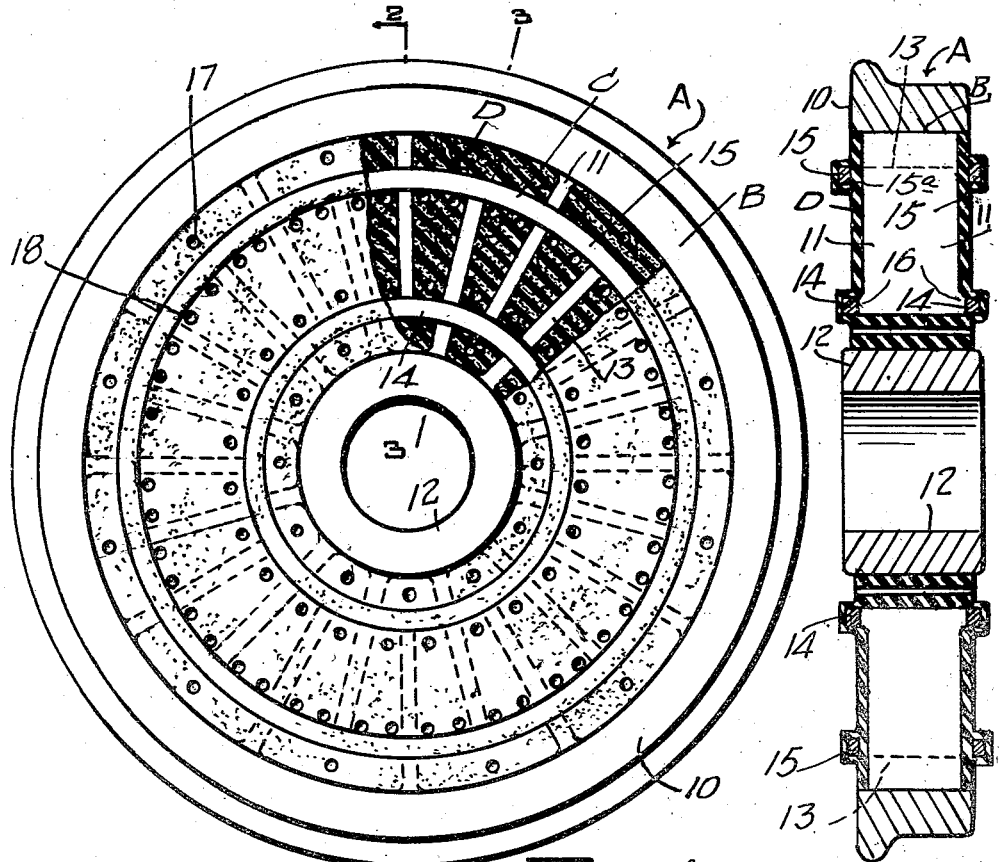
Fig. 1 is a plan view of a complete wheel according to the present invention with part of the construction broken away and shown in section.
Fig. 2 is a transverse section taken along the line 2—2 of Fig. 1.

Attention is now invited to Figure 2, particularly in order to illustrate the relation of the tie rings 14 and 15 respectively to the filled flexible mass. It is understood, of course, that the tie rings are fastened to alternate blades 11 or 13 as the case may be, that is, the tie rings 14 in each case are securely fastened to the blades 11 whereas the tie rings 15 are securely fastened to the blades 13. In the case where these rings pass by the blades of the other element they are designed to be spaced from such blades and this is illustrated particularly in Figures 2 and 3 wherein it will be noted that the ends of the blades 11 and 13 in each case are formed with lateral projections or bosses 16 so that in respect to the intermediate part of each blade, and particularly the adjacent blade of the other element, the rings 14 and the rings 15 in each case are then spaced outwardly substantially from the next adjacent blade of the opposed element. Accordingly, therefore, it will be clear that a thickness of filler occurs as at 14$^a$ and 15$^a$ respectively, between the rings 14 and 15 and those blades which they pass but to which they are not connected. This, therefore, will have the result of eliminating any scissor or grinding action that the tie rings might have on the filler at the point where these rings pass these blades. The inner element C is in effect suspended resiliently in relation to the outer element B and insulated therefrom by the filler. Consequently there is no metal to metal continuity between the outer element and the inner element.

A wheel so constructed will have the result of dampening vibration through the yieldable filler and, apart from this it should be noted that due to the construction involved including a plurality of blades of complementary character and of a number and size which may be calculated to be necessary in any given instance, any practical desired load may be handled by the wheel. It will be noted that the load distribution is efficiently distributed and will be uniformly taken by the blade elements whose surface may be calculated to meet the varied requirements of service.

In order to eliminate any detrimental heating as well as to overcome pinching of the filling element I prefer to incorporate openings at predetermined points to act as both pressure and flow spaces. These are preferably located as shown in Figure 1, one series 17 being disposed at the end of each blade member 11 or 13 as the case may be and a second series 18 between each pair of adjacent blades 11 and 13 respectively and spaced outwardly of the tie rings 14 and inwardly of the tie rings 15.

The openings 17 tend to neutralize the action of any compression wave that might be developed whereas the openings 18 provide for any necessary easement at points where the filler will be most active. Apart from this the openings in general provide, as indicated, a means of cooling.

Figure 3:
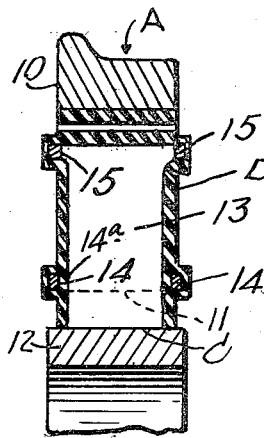
Fig. 3 is a fragmentary transverse section taken along the line 3—3 of Fig. 1.

The filling medium D may be introduced in such quantity as to completely embed the blades 11 and 13, and may also be caused to overlie the tie rings 14 and 15 as shown in Figures 2 and 3. However, it will be clear that the tie rings may be left exposed and in some constructions part of the blades may be exposed.

Figure 8:
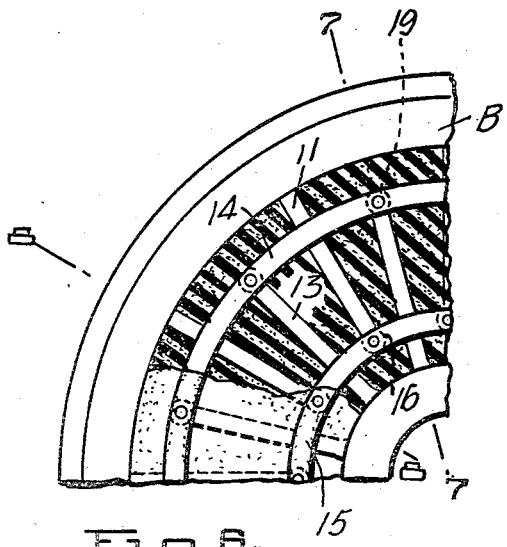
Fig. 8 is a fragmentary transverse section taken substantially along the line 8—8 of Fig. 6.
Figure 7:
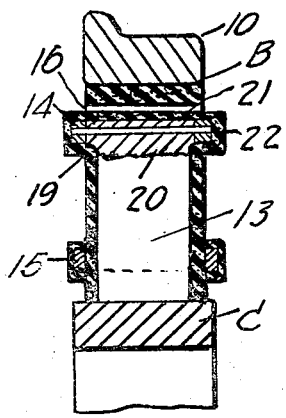
Fig. 7 is a fragmentary transverse section taken through the construction shown in Fig. 6 and taken substantially along the line 7—7 of Fig. 6.
Figure 8:
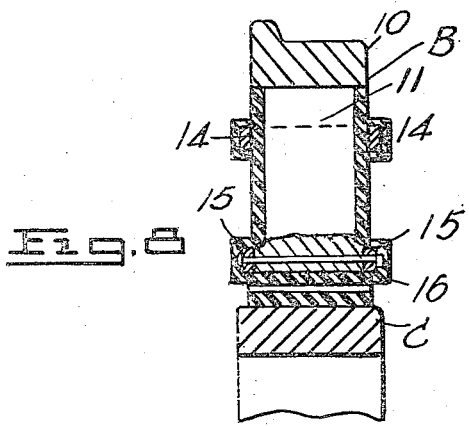

In Figures 6, 7, and 8 an alternative construction is shown wherein the blades 11 and 13 are formed with enlarged heads 19 and bored as at 20 to receive therethrough bolts 21 secured by suitable nuts or the like 22. Alternatively, this connection may be effected by riveting. The tie rings 14 and 15 may therefore be secured in this manner instead of by welding.

Figure 9:
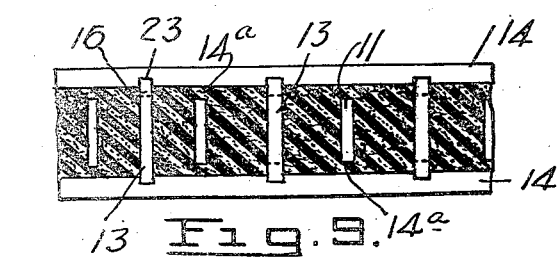
Fig. 9 illustrates an alternative method of mounting annular bracing or tying rings to that illustrated in Figs. 1 and 6.

A further alternative manner of mounting the tie rings 14 and 15 is illustrated by way of Figure 9 wherein the tie rings are notched as at 23 to receive the bosses 16 of the blades 11 and 13 where they occur, and the blades are welded at this point to the ring which they are designed to fit, the alternate blades passing between the rings of the other element as the case may be and are spaced therefrom. In the case of Figure 9, the blades 11 are spaced from the rings 14 as indicated at 14$^a$ and of course extend on down to connect with the rings 15 which would be located beneath and connect in similar manner with the blades 11 through the bosses 16 at the ends of these blades.

The alternative constructions just referred to illustrate that variations may be made in respect to the preferred structure, and other variations, of course, could be employed. However, the foregoing will serve clearly to illustrate the principle of the invention through which a wheel, having resilient and vibration dampening characteristics, may be produced in a comparatively simple manner. The wheel, in effect, employs three main parts, namely, the elements B and C and the filling material. For heavy duty the tie rings are of substantial importance, but in the case of light duty wheels it is possible that these tie rings may be eliminated. In brief, therefore, the wheel mainly comprises a rim, and a hub and a filling material having resilient characteristics which, forms the sole means of continuity between these two elements, the wheel including an intermediate framework for reinforcing and load-assuming purposes.

The filling material is preferably rubber or rubber containing material, although synthetic rubber may be employed, while other elastic compositions having resilient characteristics are within the scope of this invention which, seeks to include any suitable filler which may be inserted and cured to form a resilient but stable wheel core. The term "cured" is used particularly in the sense of processed, such as vulcanizing in the case of rubber, to provide a practical stable body having these characteristics.

By providing a wheel unit of this kind it will be clear that the radially extending blades of each element B and C when arranged in complementary relationship, form the means of distributing the load, the magnitude of which will be in proportion to the extent of the surface provided in these blades for assuming the load. In other words, it will be clear that the surface of these blades may be increased or decreased as load requirement demands, whereas due to their uniformity of location the load will be uniformly distributed. Moreover, due to the fact that the blades of the rim element B and the blades of the hub element C are not long enough to establish a blade-to-rim and blade-to-hub continuity, the filler constitutes the sole means of continuity between the hub and the rim. It will therefore be apparent that I provide a vibration dampening wheel which will provide for necessary strength according to design in comparison to the loads it is designed to assume.

What I claim as my invention is:

1. A wheel comprising two main structural elements in the form of a rim and a hub operatively arranged in concentric relation to one another, each of said elements having radially disposed blades projecting therefrom, of a length shorter than the distance between the hub and the rim, each blade of each element being disposed between a pair of blades of the other element and in circumferentially spaced apart relation to the blades of the other element, tie rings secured to the blades of each element adjacent to their free ends and disposed in concentric relation to the rim and hub, and a filling material having resilient characteristics disposed in the annular space between said elements and at least partially embedding said blades, said filling material being processed to provide a resilient but stable wheel core and forming the means of continuity between rim and the hub.

2. A wheel comprising two main structural elements in the form of a rim and a hub operatively arranged in concentric relation to one another, load supporting means in connection with each of said elements and a filling material having resilient characteristics disposed in the annular space between said elements and in contact with said load supporting means providing a resilient but stable wheel core and forming the means of continuity between the rim and the hub, said core being orificed adjacent to said load supporting means.

3. A wheel as claimed in claim 1, in which the blades are formed with laterally projecting shoulders adjacent to their free ends to engage the tie rings, said laterally projecting shoulders serving to space the tie rings from the side edges of the adjacent blade of the other element.

4. A wheel comprising two main structural elements in the form of a rim and a hub operatively arranged in concentric relation to one another, each of said elements having radially disposed blades projecting therefrom, of a length shorter than the distance between the hub and the rim, each blade of each element being disposed between a pair of blades of the other element and in circumferentially spaced apart relation to the blades of the other element, tie rings secured alternatively to the blades of each element adjacent to their free ends and disposed in concentric relation to the rim and hub, said blades being formed with laterally projecting shoulders adjacent to their free ends to engage and receive said tie rings, said shoulders spacing said tie rings from the side edges of the adjacent blades of the other element, and a filling material having resilient characteristics disposed in the annular space between said elements embedding said blades and at least partially embedding said tie rings and filling the space formed between the tie rings and said blades, said filling material providing a resilient but stable wheel core and forming the means of continuity between the rim and the hub.

5. A wheel as claimed in claim 4, in which the wheel core is orificed adjacent to each blade.

6. A wheel comprising two main structural elements in the form of a rim and a hub operatively arranged in concentric relation to one another, each of said elements having radially disposed blades projecting therefrom, of a length shorter than the distance between the hub and the rim, each blade of each element being disposed between a pair of blades of the other element and in circumferentially spaced apart relation to the blades of the other element, tie rings secured alternatively to the blades of each element adjacent to their free ends and disposed in concentric relation to the rim and hub, means for spacing said tie rings from the side edges of the adjacent blades of the other element, and a filling material having resilient characteristics disposed in the annular space between said elements embedding said blades and at least partially embedding said tie rings and filling the space formed between the tie rings and said blades, said filling material providing a resilient but stable wheel core and forming the means of continuity between the rim and the hub.

JAMES MATTHEW MacLEAN.